United States Patent
Lamothe (10) Patent No.: US 7,952,323 B2
(45) Date of Patent: May 31, 2011

(54) BATTERY CHARGER OPERATING "ALL OR NOTHING" WITH A PROTECTIVE POWER SUPPLY CIRCUIT FOR MONOLITHIC INTEGRATED CIRCUITS USING THE ANTENNA ENERGY

(75) Inventor: Christian Lamothe, Travers (CH)

(73) Assignee: EM Microelectronic-Marin S.A., Marin (CH)

( * ) Notice: Subject to any disclaimer, the term of this patent is extended or adjusted under 35 U.S.C. 154(b) by 662 days.

(21) Appl. No.: 11/964,489

(22) Filed: Dec. 26, 2007

(65) Prior Publication Data
US 2008/0150476 A1    Jun. 26, 2008

(30) Foreign Application Priority Data
Dec. 22, 2006   (EP) .................................... 06127002

(51) Int. Cl.
*H02J 7/00*      (2006.01)
*G06K 19/06*   (2006.01)

(52) U.S. Cl. ........................................ 320/108; 235/492
(58) Field of Classification Search .................... 320/108
See application file for complete search history.

(56) References Cited

U.S. PATENT DOCUMENTS

| | | | |
|---|---|---|---|
| 5,600,225 A * | 2/1997 | Goto .............................. | 320/108 |
| 5,672,952 A * | 9/1997 | Szepesi ......................... | 320/164 |
| 5,702,431 A | 12/1997 | Wang et al. | |
| 6,227,204 B1 | 5/2001 | Baumann et al. | |
| 6,249,212 B1 | 6/2001 | Beigel et al. | |
| 2003/0017804 A1 | 1/2003 | Heinrich et al. | |
| 2003/0231106 A1 | 12/2003 | Shafer et al. | |
| 2004/0227002 A1 | 11/2004 | Watanabe | |
| 2004/0245348 A1 | 12/2004 | Nagaoka et al. | |
| 2005/0068019 A1 | 3/2005 | Nakamura et al. | |
| 2005/0194926 A1 | 9/2005 | Di Stefano | |
| 2006/0012464 A1 | 1/2006 | Nitzan et al. | |
| 2006/0128345 A1 | 6/2006 | Ootaka et al. | |
| 2006/0255767 A1 | 11/2006 | Wong et al. | |
| 2006/0265181 A1 | 11/2006 | Stewart | |
| 2007/0057073 A1 * | 3/2007 | Mamba et al. ................ | 235/492 |

FOREIGN PATENT DOCUMENTS

GB    2372534 A    8/2002
JP    2000-090221    3/2000

OTHER PUBLICATIONS

European Search Report issued in corresponding application No. EP 06 12 7002, completed Aug. 7, 2007.

* cited by examiner

*Primary Examiner* — Edward Tso
*Assistant Examiner* — M'Baye Diao
(74) *Attorney, Agent, or Firm* — Griffin & Szipl, P.C.

(57) ABSTRACT

An integrated radiofrequency circuit (1) is provided that includes an antenna (2) for receiving radiofrequency signals, a rechargeable battery (3) and a battery charger (5) using the radiofrequency signals to charge said battery. The circuit is characterized in that the battery charger is integrated in the same substrate as the integrated radiofrequency circuit and in that the battery charger includes a calibrating mechanism, a current source calibrated by the calibrating mechanism and delivering a charge current of constant maximum intensity drawn from the received radiofrequency signals, and a comparator between a reference quantity representative of the end of battery charge level and a variable quantity representative of the battery charge level supplying at output a control signal (batchend) for charging or not charging the battery.

19 Claims, 6 Drawing Sheets

BATTERY CHARGER OPERATING "ALL OR NOTHING" WITH A PROTECTIVE POWER SUPPLY CIRCUIT FOR MONOLITHIC INTEGRATED CIRCUITS USING THE ANTENNA ENERGY

This application claims priority from European Patent Application No. 06127002.1, filed Dec. 22, 2006, the entire disclosure of which is incorporated herein by reference.

FIELD OF THE INVENTION

The present invention concerns, generally, an integrated monolithic radiofrequency circuit including an antenna for receiving radiofrequency signals, a rechargeable battery and a battery charger integrated in the monolithic circuit using the radiofrequency signals to charge the battery. The invention concerns, more specifically, the battery charger operating "all or nothing" integrated in the monolithic circuit.

BACKGROUND OF THE INVENTION

Radiofrequency circuits including an antenna receiving radiofrequency signals and powered by a rechargeable battery are known generally from the prior art. Incorporating a battery charger that uses the energy received via the radiofrequency signals to charge the battery, in order to avoid dismantling the batter, is also known.

One example is given, in particular in U.S. Pat. No. 6,249,212, which discloses a radiofrequency circuit, shown in FIG. 7, on which a bridge 111 formed by PN junction diodes is mounted, allowing the energy received from radiofrequency signals transmitted by a remote reader to be recovered.

Figure 7:
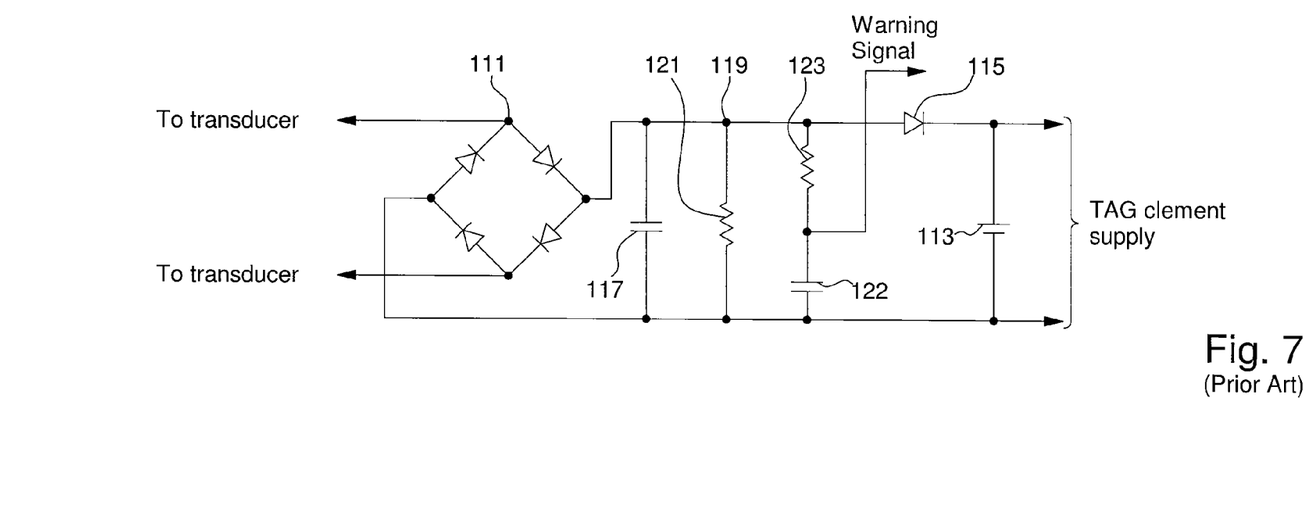
FIG. 7 shows a radiofrequency circuit according to the prior art.

The capacitor 117 is used for filtering the harmonics for recovering the continuous energy component. Resistor 121 discharges capacitor 117 in the absence of any electromagnetic field. The time constant created by capacitor 122 and resistor 123 provides a signal to the circuit to inform the latter of the presence of the field.

Diode 115 stores energy in battery 113, which powers the rest of the circuit and prevents the battery being emptied in the absence of any field, i.e. when the level of voltage brought to the battery is lower than the battery charge level. Thus, in this radiofrequency circuit, the battery charge function is achieved by diode 115. The battery charger is thus limited to a single diode.

This battery charger has numerous drawbacks. The pn junction diode component whose two connectors can be connected freely is not available or is poorly characterized in integrated technology. There is thus a fundamental problem of component availability or characterization.

Moreover, the battery charge voltage has to be comprised within relatively specific limits, thus the charge voltage provided by a diode depends upon the voltage applied across the anode thereof, the cathode being connected here to the battery. Consequently, with voltages whose amplitude varies greatly as is the case in our application, i.e. able to exceed 8 volts, it is impossible to use a large capacitance battery as would be desirable. This type of single diode mounting could, at best, be used for recharging a super capacitor, an element that has a much smaller storage capacity, but that tolerates a much greater charge voltage variation. Another alternative would be to calibrate the distance of use of the circuit to prevent any over-voltage, and thus overload, but this is typically the type of constraint that on does not wish to impose on the user. Thus, the use of this type of one diode battery charger leads directly to a problem of battery life and reliability.

Moreover, the diode also has the drawback of not allowing a calibrated current load. The current in a diode varies exponentially as a function of the voltage at the terminals thereof and, thus, exhibits great variations. As it cannot be calibrated, the current also causes a problem of battery life and reliability in the case considered here.

This diode mounting has yet another drawback, linked to the fact that the current-voltage features and, consequently the final battery charge voltage varies greatly with the temperature. The current doubles approximately every 10° C. for a silicon junction, which cannot be tolerated with current proper operating constraints within broad temperature ranges.

Another requirement to be met is having a signal that indicates when the battery charge has finished. In fact, when only one diode is used as the battery charger, this end of battery charge indication can no longer be physically provided by the diode. Moreover, the moment when the diode is no longer charging the battery is not clearly defined. Indeed, the current-voltage feature is exponential, which means that the charging current decreases gradually as the battery is charged, but this does not mean that it is cancelled out. Thus, depending upon the charging current level for a given voltage at the diode anode, there will be a large variation in the voltage at the cathode. For example, for a current changing from 15 µA to 500 nA, a battery voltage variation of the order of 400 mV can be obtained, which cannot be tolerated for most applications.

Wireless battery chargers for recharging batteries that do not require conventional wire recharging are known from the prior art, in particular from US Patent No. 2005/0194926 A1 and GB Patent No. 2 372 534. For this purpose, the batteries are fitted, by means of a contactless battery charger using the energy received from a radiofrequency carrier signal delivered by a remote transmitter. However, no concrete indication is given as to the practical making of such a wireless battery charger, in particular as to the possibility of integrating the latter directly in a monolithic integrated circuit.

Thus, none of the solutions of the prior art presented above is applicable, either because of the numerous drawbacks that they generate, or because of the absence of any concrete solution for the efficient implementation thereof.

One of the problems that arises is thus the making of a contactless battery charger incorporated in a monolithic radiofrequency integrated circuit, using the energy received by an antenna, drawn from radiofrequency signals transmitted by a remote transmitter for recharging the circuit battery. The components outside the monolithic integrated circuit are limited to the antennae, uncoupling capacitors for the various internal supply voltages and the rechargeable battery. The battery charger thus has to be devised fin the same technology as the circuit in which it is integrated, and must not use any external components in order that a reduced number of components is used in the final application.

More specifically, the problem consists in extending the life of this type of battery while optimising the charge, including the charging time. Within the scope of the present invention, two effects likely to substantially reduce the life of a battery have come to light. The first point concerns overcharging the battery, i.e. charging periods when the battery is already completely charged. The second point concerns the charging current applied to the battery terminals during the recharging periods. This current must not depend upon the battery charge level so as to ensure a suitable charging time. Moreover, the current must not have current peaks liable to seriously damage the battery. Indeed, the life of a battery depends not only upon the end of charge voltage value, since any over-charging is detrimental, but also upon the charging current value used for recharging. A current that is too high reduces the life of the battery. This risk arises in particular in the case of a discharged battery to which there is applied a charging voltage equal to the nominal voltage thereof without any current limiting elements. This charging current can then take excessive values. Conversely, the fact of adding a resistive type maximum current limiting element, i.e. a charging current proportional to the voltage at the terminals of the element, leads to a charging current that decreases during the whole of the battery charge period, which extends the battery charge period proportionally, which is evidently also undesirable.

SUMMARY OF THE INVENTION

One of the main challenges thus lies in the difficulty of fulfilling certain requirements, for the battery charger, which are not easy to reconcile with the use of monolithic integrated circuits. These constraints include the restriction of space, which requires avoiding the use of external components for the battery charger. There are also constraints of precision and reliability, both as regards the end of charge voltage of the battery, which must be well defined, and the charging current intensity in order to prevent damaging the battery.

Thus, in order to avoid overcharging the battery, whatever the level of energy received by the circuit, the battery charger has to provide an end of charge voltage that is as precise as that defined by the battery manufacturer and within a temperature range that broadly covers the range of battery use. Moreover, in order to avoid the two aforecited problems, the battery charger will behave like a virtually constant current generator, which stops charging when the end of charge voltage is reached. In the case of pulsed energy, the maximum current impulse amplitude will be deemed to be virtually constant.

It is therefore one of the main objects of the present invention to overcome the aforementioned constraints and drawbacks by making an integrated radiofrequency circuit including an antenna for receiving radiofrequency signals, a rechargeable battery and a battery charger using the radiofrequency signals to charge the battery. The circuit is characterized in that the battery charger is integrated in the same substrate as the integrated radiofrequency circuit and in that the battery charger includes calibration means, a source current calibrated by the calibration means and delivering a current charge of constant maximum intensity, drawn from received radiofrequency signals and a comparator between a reference quantity representative of the battery end of charge level and a variable quantity representative of the level of battery charge, supplying at output a control signal for charging or not charging the battery.

Thus the important points to satisfy for a contactless battery charger integrated in an integrated radiofrequency circuit, are satisfied, namely being integrated in a monolithic circuit without any external components, ensuring a precise end of battery charge voltage while avoiding overcharging, whatever the level of energy received and the temperature at which the charging occurs, and charging with a virtually constant calibrated current during the entire battery charge period.

It is another object of the present invention to overcome the constraint as to the flexibility of use of various types of battery, i.e. to be able to use several types of battery, or in the extreme, to avoid using the battery for the final device, while keeping the same type of integrated circuit. For this purpose, the reference quantity representative of the end of battery charge can be adjusted depending upon the type of battery used. Moreover, the battery charger advantageously takes the energy it needs to operate from the radiofrequency signals and not from the battery, which means that charging starts quickly while offering a still wider choice for the type of battery that can be used.

It is yet another object of the present invention to perform, as far as possible, the main function of the integrated radiofrequency circuit, such as for example a communication function with the remote transmitter supplying the radiofrequency signals. This is why, it is important to ensure that the energy necessary to make the communication means operate with the remote transmitter is not used for recharging the battery. In fact, the battery charger uses the energy received by the antenna. This energy may vary substantially depending upon the distance separating the circuit from the transmitter. This energy is also used for powering other functions of the circuit in which the battery charger is integrated. If the battery charger uses a quantity of energy that is indispensable to the proper working of the circuit, this information manifests itself as a decreasing voltage supply to the circuit, the battery charger then itself interrupts the battery charge until the level of available energy becomes sufficient again. For this purpose, a circuit is incorporated for monitoring the available energy from the received radiofrequency signals, including a comparator between the available energy less the energy necessary for the operating units of the circuit, with the energy necessary for charging the battery. If the energy is not sufficient for both operations, the monitoring circuit sends a control signal to prevent the battery being charged. This means that the monitoring circuit checks the available energy to postpone charging the battery until later if the energy transmitted at that moment is insufficient to assure both recharging the battery and the proper working of the operating units of the integrated circuit.

It will be noted that the voltage comparator between the battery voltage and the reference voltage, arranged in the battery charger, is not disturbed by the consumption of energy for recharging the battery insofar as the battery is not charger if there is not enough energy to allow the rest of the circuit to operate. Thus, poor operation of the circuit dedicated to recharging the battery is prevented, which thus means that a precise end of charge voltage can always be ensured.

According to advantageous embodiments of the invention, the integrated circuit includes battery charger switching means so that it can be decided whether or not to recharge the battery and means indicating the end of battery charge. This removes the constraints as to observation and control respectively of charging and the charger, by indicating the end of battery charge and by controlling the start or stop of the charger.

The integrated circuit can also operate with a different energy source from a battery, for example originating from the received radiofrequency signals. It will be noted, in this regard, that as the battery is not the only energy source of the circuit, it will consequently not directly power all of the operating units of the integrated circuit. Thus, the battery charger is not directly connected between the energy source, here the antenna associated with the circuit and the power supply of the operating units of the circuit. This arrangement enables the integrated circuit to be started very quickly in the presence of a field if the battery is empty and thereby either to use large capacity batteries or not to use the battery at all and to replace it with nothing in the case of cheaper versions of the final application.

BRIEF DESCRIPTION OF THE DRAWINGS

Other features and advantages of the present invention will appear more clearly upon reading the following detailed description of embodiments of the invention, given solely by way of non-limiting example and illustrated by the annexed drawings, in which.

DETAILED DESCRIPTION OF THE INVENTION

The present invention, which will now be presented, is given purely by way of non-limiting illustration with reference to FIGS. 1 to 6. The solution proposed consists in finding a suitable structure for a battery charger integrated in a monolithic integrated circuit, which answers the specifications but without exhibiting the numerous drawbacks encountered in the prior art. The battery charger structure developed here therefore operates in an "all or nothing" system, i.e. by switching to charging the battery in the "ON" mode and to not charging the battery in the "OFF" mode.

Figure 1:
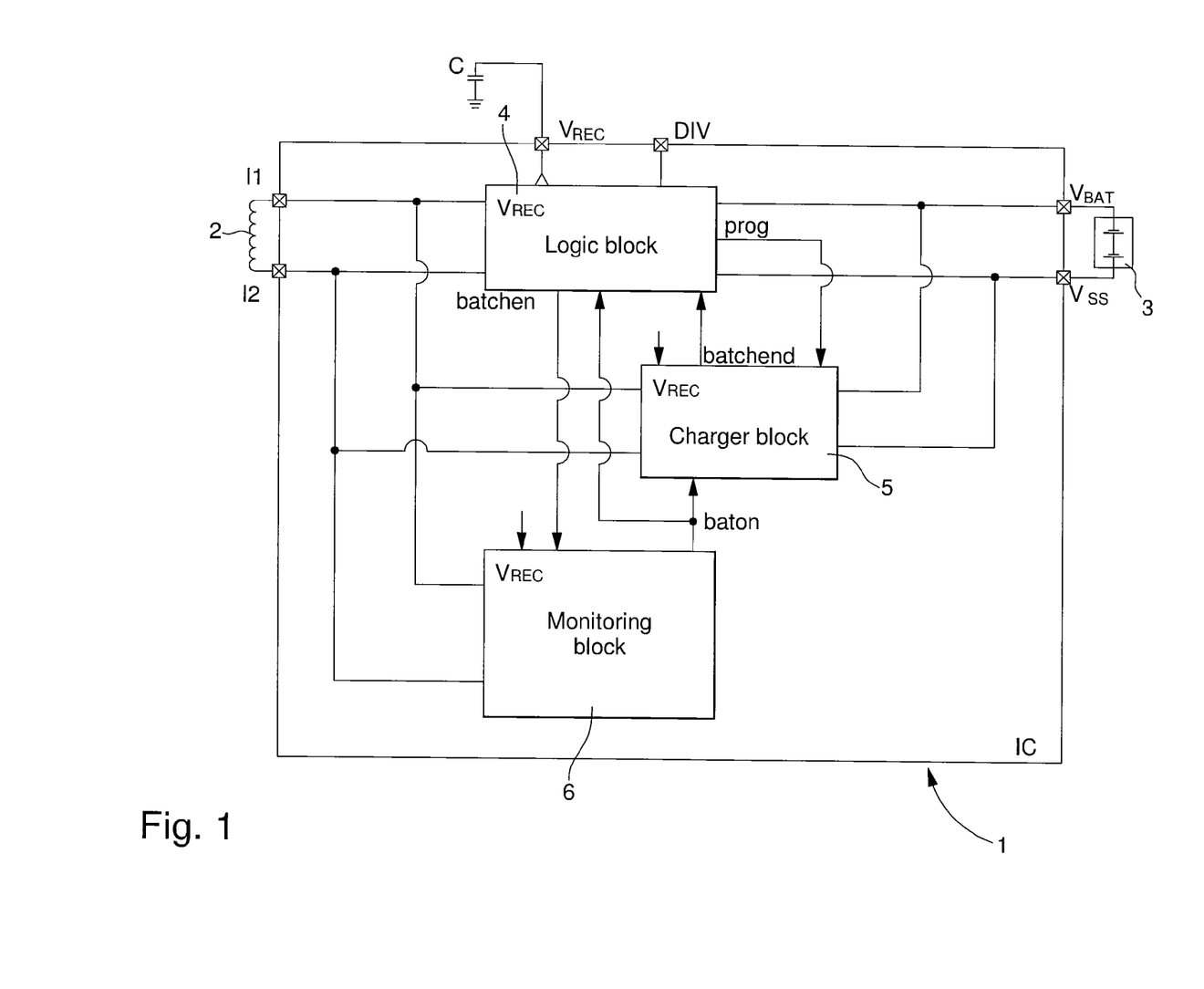
FIG. 1 is a block diagram of the elements relating to the battery charger of an integrated radiofrequency circuit according to a preferred embodiment of the invention

FIG. 1 shows a block diagram of an integrated radiofrequency circuit according to a preferred embodiment of the invention. The radiofrequency circuit includes a monolithic integrated circuit IC 1. The components outside monolithic integrated circuit 1 are limited to the antenna 2 (or antennae if there are several), the capacitors (not all shown) for uncoupling the various internal supply voltages and rechargeable battery 3. Integrated circuit 1 includes a logic block 4, which will not be detailed within the scope of the present invention. This logic block 4 includes all of the operational elements necessary for the circuit to operate properly and for the application implemented in the circuit. This application may, for example, be an active transponder type application for communication with an external reader. Integrated circuit 1 further includes a battery charger designed in the same technology as the circuit in which it is integrated to avoid using any external elements in addition to those mentioned, which thereby reduces the number of components used in the final application. The battery charger includes a first main block 5, which is actually responsible for controlling the charging of the battery and which will be described in more detail with reference to FIGS. 3, 4 and 5. Generally, this charge control block or charger block 5 generates an internal control signal ON/OFF, which switches switching means, advantageously made in the form of a single MOS transistor working in blocked-saturated mode, to charge, or not charge, battery 3 by using the energy received via the antenna 2.

According to an advantageous embodiment, the charger further includes a second block 6, which monitors the supply voltage $V_{REC}$ of charger block 5 and the whole of the integrated circuit and which will be described in more detail with reference to FIG. 6. Generally, this monitoring block 6 checks whether the level of received energy stays higher than the level necessary for logic block 4 to operate properly. Via the start battery charge request signal "batchen" originating from logic circuit 4, monitoring block 6 authorises the charging of the battery in charger block 5 via the control signal "baton". In the opposite case, i.e. if the energy received is insufficient, the monitoring block prevents charging order signal "baton" being sent to charger block 5. Naturally, after having received the order to charge the battery, charger block 5 will only execute the order if it is really necessary. If the battery is charged, charger block 5 interrupts the charging of the battery when the latter is charged, and sends logic circuit 4 data meaning that the battery has reached its charge voltage. This data is transmitted by the signal "batchend". Thus, authorisation and prohibition are thus transmitted by monitoring block 6 via the control signal "baton" to charger block 5, after reception of a "batchend" signal supplied by logic block 4 indicating that battery charging is desirable. Logic block 4 is informed as to the decision taken by monitoring block 6 via the "baton" signal and the state of charge of the battery by charger block 5 via the "batchend" signal.

It will be noted again, generally, that in the embodiment of the present invention as it is shown here, logic circuit 4 can be powered either by battery 3, or directly by the external field received by means of antenna 2 when circuit 1 is inside the field.

Figure 2:
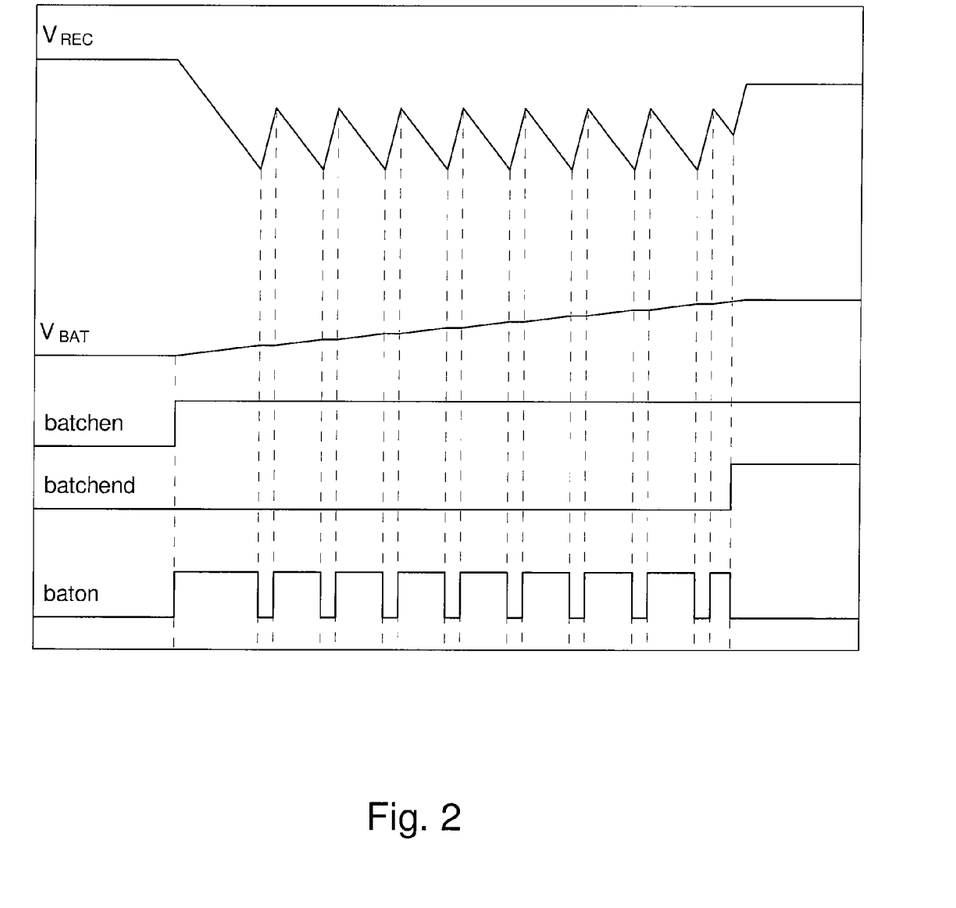
FIG. 2 shows the change in the level of battery charge as a function of the received supply voltage.

FIG. 2 shows the change in the level of battery charge as a function of the supply voltage received. The signal $V_{REC}$ represents the rectified supply voltage received via the radiofrequency antenna. The signal $V_{BAT}$ represents the battery voltage. The "batchen" and "batchend" signals respectively represent the control signal for charging or not charging the battery and the signal indicating when the battery charging has finished. Thus, it will be noted on this graph that the available power supply decreases when the battery is actually recharged and conversely the supply voltage increases again quickly when the charge is momentarily interrupted, via the control signal "baton", in order to guarantee a minimum available supply voltage for ensuring that the circuit logic can operate.

Finally, it will be noted that the "batchend" signal, which indicates the end of battery charge passes to the logic value 1, when the battery voltage reaches the desired charge level, as will be explained in detail in the following description.

Figure 3:
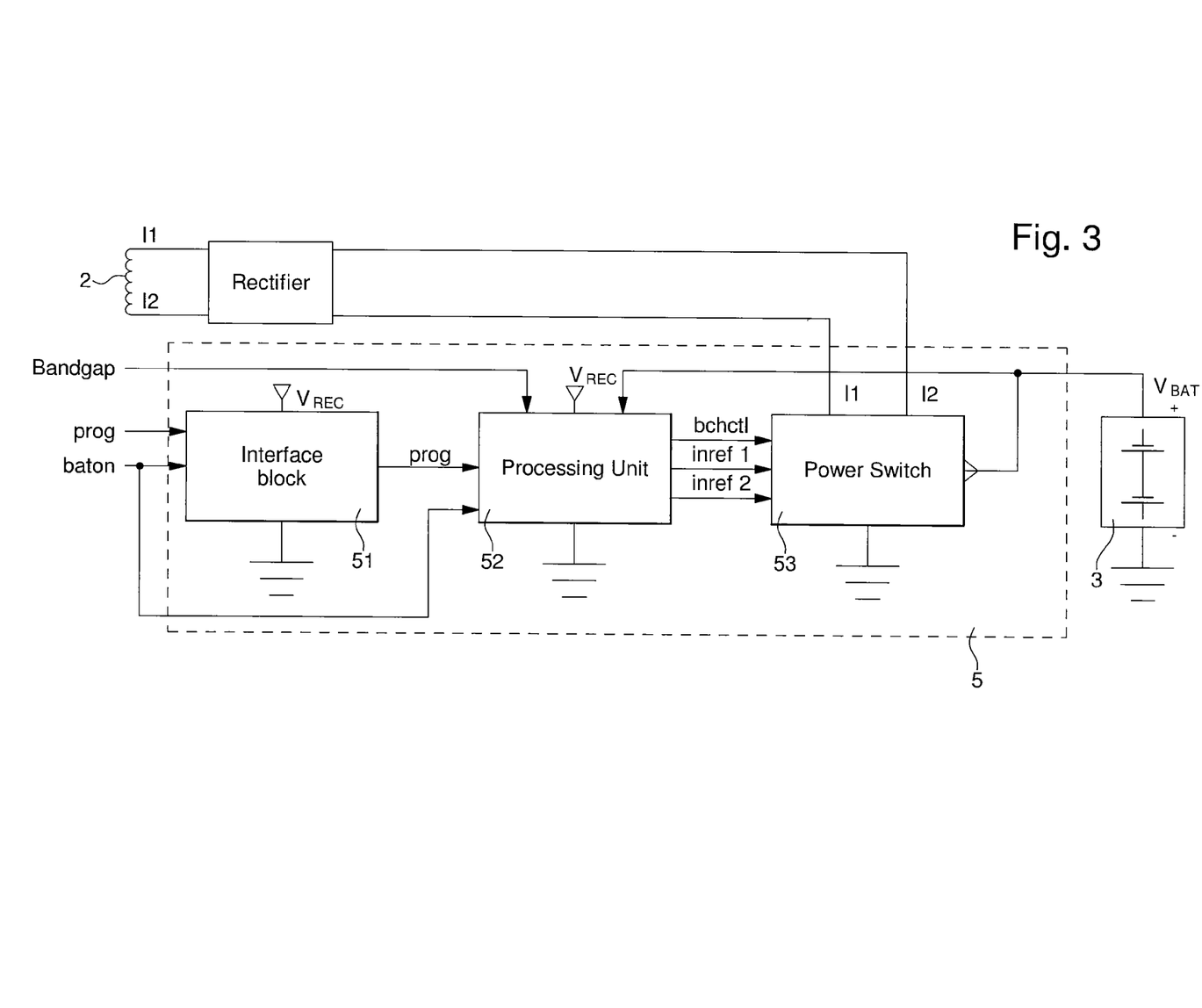
FIG. 3 is a block diagram of the battery charger integrated in the radiofrequency circuit.

FIG. 3 shows a schematic view of charger block 5 of FIG. 1. Antenna 2 is also shown, with an integrated rectifier connected to its terminals and rechargeable battery 3. Charger block 5 can be broken down into three sub-blocks, an interface block 51, a processing unit 52 and a power switch 53.

Interface block 51, which is shown here purely by way of indication, levels the signals receives from the circuit logic so as to make them compatible with the level of supply voltage of processing unit 52 and to shape the battery charge order signal sent by processing unit 52.

Processing unit 52, which is directly responsible for charging the battery is formed of a voltage comparator between the voltage of the battery itself and a reference voltage, and a circuit which could be considered as a calibrated current source able to be pulsed, which shapes the energy received from the antenna. The power switch 53 is which could be consider as a switch controlled by the voltage comparator that puts the battery in contact with the energy source.

More specifically, processing unit 52 is responsible for a dual task, consisting, on the one hand, in checking the battery voltage so as to order the battery to be charged or not charged, and on the other hand, to calibrate the charge current used. For these two tasks, a bandgap voltage reference is advantageously used as will be described in more detail in FIG. 4. Processing unit 52 supplies at output at least two signals, a first control signal "bchctl" to indicate whether the battery should be charged or not and at least a second signal "$I_{REF}$" in the form of a calibrated current for controlling the charge current drawn from the radiofrequency signals received via antenna 2. Advantageously, processing unit 52 supplies two calibrated current signals, one low intensity calibrated signal and one higher intensity calibrated current. Further, according to the advantageous variant including the use of a supply voltage monitoring circuit, processing unit 42 receives a control signal "baton" from the monitoring circuit indicating whether the energy is sufficient or not for charging when this is required. If the energy is insufficient, the charging is momentarily interrupted until the energy becomes sufficient again via the control signal "bchctl" sent to power switch 53.

Power switch 53 is connected, on the one hand, to the antenna terminals I1 and I2 so as to receive the energy necessary for charging the battery, and on the other hand, to the positive terminal of the battery $V_{BAT}$ so a to supply the necessary charging current when required. Switch 53 is controlled by means of the control signal "bchctl" sent by the processing unit. When the switch is "ON", i.e. the signal "bchctl" requires the battery to be charged, the charging current is drawn from one antenna terminal or the other, provided that the voltage across one of the terminals is higher than the battery voltage. When this is not the case, means are provided for preventing the battery discharging into the antenna as will be described in detail in FIG. 5. The intensity of charging current $I_{REF}$ is controlled by one of the reference current signals sent by processing unit 52.

Figure 4:
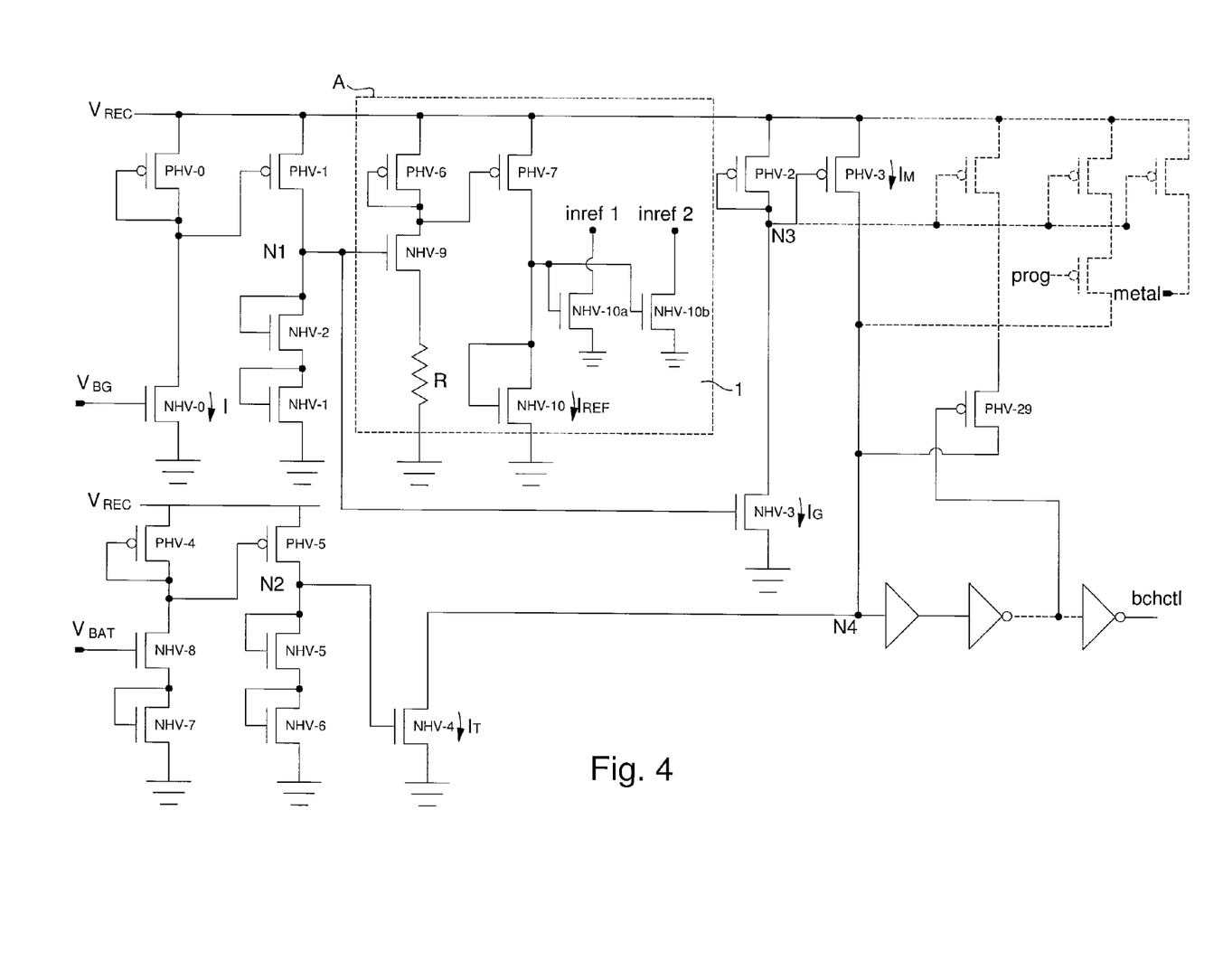
FIG. 4 is a detailed diagram of the control block of the battery charger.

FIG. 4 is a detailed diagram of the battery charger control block 52, i.e. of the processing unit briefly described with reference to FIG. 3. As was mentioned previously, the battery charger processing unit essentially performs two functions: that of voltage comparator between the battery voltage and a reference voltage; and that of calibrated current source for controlling the battery charge current.

One important aspect of the invention is thus the way in which the battery charger comparator operates. It compares the battery voltage that one wishes to be adjustable with a reference voltage without using any resistive or capacitive divider and without consuming any electric charge either from the battery or from the reference voltage source. In order to achieve this objective, the technique used here is a technique of equation linearization of MOS transistors working in saturated mode, which will be explained. This technique consists in ignoring the transistor threshold voltage, in this example in MOS technology, in order to be able to make much simpler analogical calculations, virtually independently of technological variations.

Let us now consider in more detail the components shown in FIG. 4. Transistor NHV_0, whose gate is connected to a bandgap reference voltage, designated VBG, whose source is earthed and whose darin is at a saturation voltage. The principle of this method rests on the similarity of the components and thus the laws that govern them, a method that is frequently used in the field of monolithic integrated circuits. One thus obtains the current that passes through the NHV_0 transistor:

$$I=\tfrac{1}{2}.K.S(V_{BG}-V_T)^2 \quad [EQ.\ 1]$$

where k is mobility, S the shape factor of transistor NHV_0 and $V_T$ the threshold voltage thereof.

This current I is recopied by a current mirror, formed by transistors PHV_0 and PHV_1 such that a fraction, a quarter in the example taken here, of the current passes through a series of two transistors NHV_1 and NHV_2 identical to the transistor NHV_0 used. This current is then written:

$$I/4=\tfrac{1}{2}.K.S(V_2-V_T)^2 \quad [EQ.\ 2]$$

where V2 is the voltage across the gate of NHV_1.

By combining equations [EQ. 1] and [EQ. 2], one obtains the following equation:

$$2.V_2=V_{N1}=V_{BG}+V_T \quad [EQ.\ 3]$$

where, by construction $2.V_2$ represents the voltage VN1 across the gate of transistor NHV_2 at node N1.

At this level, voltage is used for two objectives, on the one hand, for creating a reference current that is used for calibrating the battery charge current, and on the other hand, a reference voltage that is used for comparison with a voltage representative of the battery voltage in order to define the end of battery charge.

We will now consider, first of all, the means implemented to create a reference current used for calibrating the charging current. Transistor NHV_9 is selected with a very high shape factor, for example of the order of 160 S, such that the voltage between the source and the gate of the transistor NHV_9 is very close to threshold voltage $V_T$. Thus, the connection of voltage $V_{N1}$ across the gate of transistor NHV_9 whose source is connected to a resistor R, itself connected to earth, gives the following voltage distribution:
VBG+VT at the gate of transistor NHV_9; and therefore VBG at the source of the transistor NHV_9 and at the terminals of resistor R, the voltage drop being VT between the gate and the source.

We therefore have a resistor R whose terminals have a potential difference of $V_{BG}$, virtually independent of the technology. A current $I_{REF}$, that is independent of the threshold voltage of the MOS transistors used thus passes through this resistor R. There is therefore the following relation:

$$I_{REF}=V_{BG}/R \quad [EQ.\ 4]$$

As previously mentioned, this reference current IREF will be used to calibrate the battery charge current. An additional current mirror is preferably provided, formed by the transistors PHV_6 and PHV_7, controlling the current passing through transistor NHV_10 which controls the transistors NHV_10A and NHV_10B supplying the reference current to terminals inref1 and inref2 for each of the connections of the antenna to the switch as will be described in more detail with reference to FIG. 5.

Figure 4A:
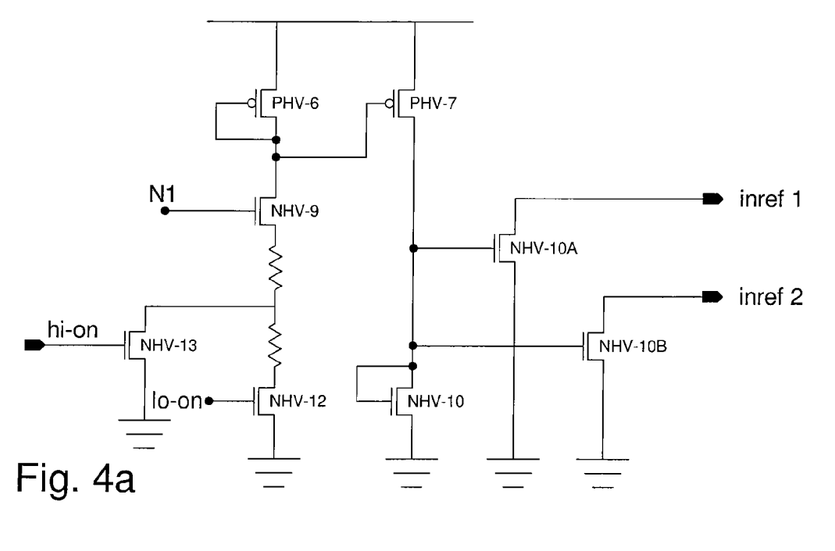
FIG. 4a shows an alternative of the calibrated current source of FIG. 4.

According to an advantageous variant, the part A framed in dotted lines is replaced by that shown in FIG. 4a, which is able to be more easily adapted to the various types of battery on the market. For this purpose, two reference current levels are obtained via a resistor that can be programmed via transistors NHV_13 and NHV_12 controlled by a charging signal respectively hi_on and lo_on. In this manner, two reference currents flowing to earth are available at connections inref1 and inref2. Each of these currents calibrates the charging current originating from connectors L1 and L2 of the receiving antenna.

Let us now consider the second objective to be achieved by the processing unit, namely the creation of a reference voltage for defining the end of battery charge. For this purpose, an intermediate current IG is created by polarising the gate of a transistor NHV_3 operating in saturation (via transistor PHV_2) with voltage $V_{N1}$ applied to its gate. This current is thus written:

$$I_G=\tfrac{1}{2}.K.S(V_{N1}-V_T)^2=\tfrac{1}{2}.K.S.V_{BG}^2 \quad [EQ.\ 5]$$

A current $I_G$ is thus obtained which no longer depends upon the threshold voltage $V_T$ of the transistors used.

It is known to proceed in the same manner for the battery voltage $V_{BAT}$. Connecting transistors NHV_7 and NHV_8 in series advantageously allows the battery voltage $V_{BAT}$ to be divided by two. In fact, the advantage of dividing the battery voltage by two here is to be able to compare relatively close voltage values. In this example, the bandgap reference voltage is of the order of 1.2 volts and the battery voltage divided by two is of the order to 1.7 volts, which is still preferable when assemblies using the similarity of components are made. Thus, with the same linearization method implemented this time by means of transistors NHV_5 and NHV_6, a voltage $V_{N2}$ of the following shape is obtained at node N2:

$$V_{N2} = V_{BAT}/2 - V_T \qquad [\text{EQ. 6}]$$

By applying voltage VN2 to the gate of a transistor NHV_7 and NHV_8 operating in saturation, one obtains the following current $I_T$ passing therethrough:

$$I_T = \tfrac{1}{2}.K.S.(V_{N2}-V_T)^2 = \tfrac{1}{2}K.S.(V_{BAT}/2)^2 \qquad [\text{EQ. 7}]$$

Thus, in the same manner, a current IT is obtained that no longer depends upon the threshold voltage of the transistors used. The idea behind such treatments of the bandgap voltage, on the one hand and the battery voltage on the other hand, is to be able to compare them in order to define the end of battery charge. Thus, currents IG derived from transistor NHV_3 and IT derived from transistor NHV_4, which is representative of the level of battery charge. In order to make current IG derived from transistor NHV_3 representative of the end of charge level, means are provided for a setting the switching voltage, i.e. the voltage for which there is equality between the current representative of the end of charge level and that representative of the battery charge level, for example via a programmable current mirror. In order to do this, the current mirror formed at least by the transistors PHV_2 and PHV_3 is used. Transistor PHV_2 is that which controls the current mirror. It thus defines the reference voltage of a programmable series of transistors (shown in dotted lines) whose gates are connected to its drain and to its gate at node N3. The currents thus mirrored originating from the drains of these programmable transistors are added at node N4 with that which passes through transistor PHV_3 at the mirror output. The sum of these currents originating from the various transistors of the current mirror is called $I_M$. This recopied current IM is identical to control current $I_G$ with a programmable multiplication factor M of the current mirror ratio, and one can thus say:

$$I_M = M.I_G \qquad [\text{EQ. 8}]$$

The output of the current mirror delivering the current IM programmed to be representative of the end of battery charge level is then connected at node N4 to the drain of transistor NHV_4 delivering the current $I_T$ representative of the current battery charge level, which is the electric equivalent of two current generators feeding into each other, namely therefore currents $I_M$ and $I_T$. Consequently, the voltage value at node N4 will go out of range and take either a value close to 0 volts if current IT is higher than current IM, or a voltage value close to the positive supply voltage, if current IM is higher than current IT. Thus, switching is obtained around the theoretic value of equality between the two currents, which defines the value for which the battery can be considered charged. This value is thus obtained for equality:

$$I_T = I_M \qquad [\text{EQ. 9}]$$

By developing the preceding equation, we obtain:

$$\tfrac{1}{2}K.S.(V_{BAT}/2)^2 = M.\tfrac{1}{2}.K.S.V_{BG}^2 \qquad [\text{EQ. 10}]$$

By simplifying the preceding equation and by taking the square root, the battery voltage value at the switch is obtained as a function of the bandgap reference voltage and the current mirror ratio:

$$V_{BAT} = 2.V_{BG}.M^{1/2} \qquad [\text{EQ. 11}]$$

Thus the information useful for the switching or the non switching of the battery charge is found at node N4, which is advantageously shaped by a chain of amplifiers. It will be noted that this chain preferably includes an even number of reverse amplifiers so as to ensure, on the one hand, a clear distinction Between the two possible voltage levels, low and high, across node N4, while conserving, on the other hand, the same sign for the output signal "bchctl".

It will be noted that in this case, the end of charge signal "batchend" is an intrinsic signal to the device and that it has only to be shaped to be able to be used outside.

By using a programmable current mirror ratio M some dispersion can be allowed on the bandgap reference voltage and some dispersion on the components used. In fact, because of the mirror ratio programming, shifts introduced by the aforecited dispersions can be corrected. In this manner, it is possible to have a setting range that is as wide as desired, which means that different types of batteries can be used.

Preferably, the current mirror ratio is varied to introduce hysteresis during switching such that two switching points exist. The switch then becomes a trigger type hysteresis switch. Here, the hysteresis is introduced by transistor PHV_9, which loops back the data from the output chain onto the current mirror ratio value.

According to another variant, there is also provided additionally or by way of alternative, a series of transistors programmable by metal mask in order to complete adjustment of the setting range.

Figure 5:
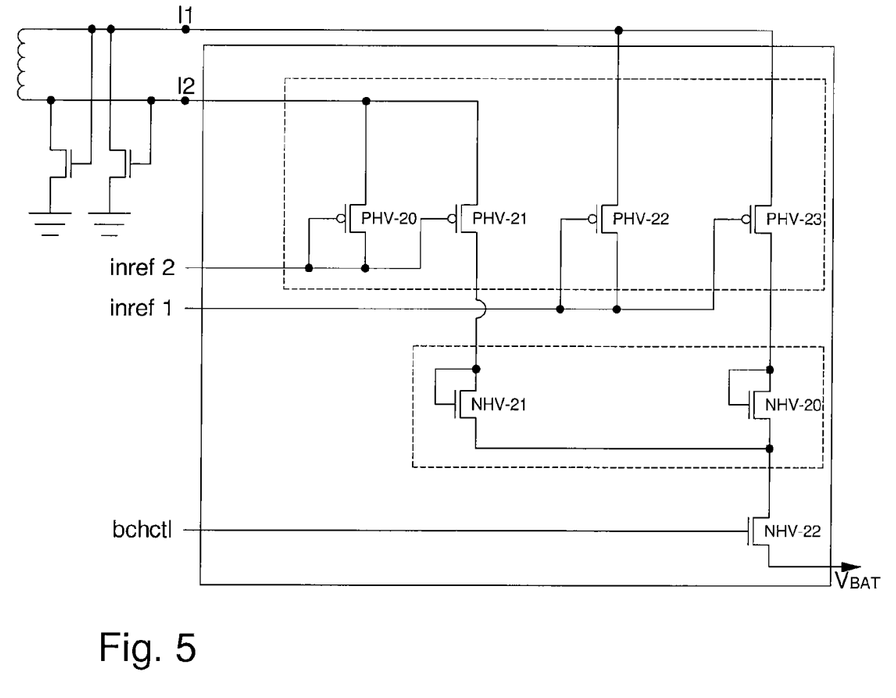
FIG. 5 is a detailed diagram of the switching block of the battery charger.

FIG. 5 is a detailed diagram of the battery charger switching block implemented in accordance with one of the variants shown in FIGS. 4 and 4a that show a constant current source with one (FIG. 4 variant) or respectively two (FIG. 4a variant) calibrated current levels given via connection terminals inref1 and inref2.

The comparator, described above and developed within the scope of the present invention, supplies a logic signal that authorises or prohibits the battery charge. This signal, called "bchctl" will directly control transistor NHV_22 of the switching block. This transistor NHV_22 operates like a switch that does or does not transfer the energy from the antenna to the battery, for example via positive terminal $V_{BAT}$ of the battery, in order to recharge the battery or not. Transistors PHV_20, PHV_21, PHV_22 and PHV_23 calibrate the antenna charge current. Advantageously transistors NFV_20 and NHV_21, which perform the anti-return function for the energy stored in the battery, are also provided.

It will also be noted that the integrated rectifier provided at the antenna terminals can be achieved for example by means of two transistors connected as is shown.

Figure 6:
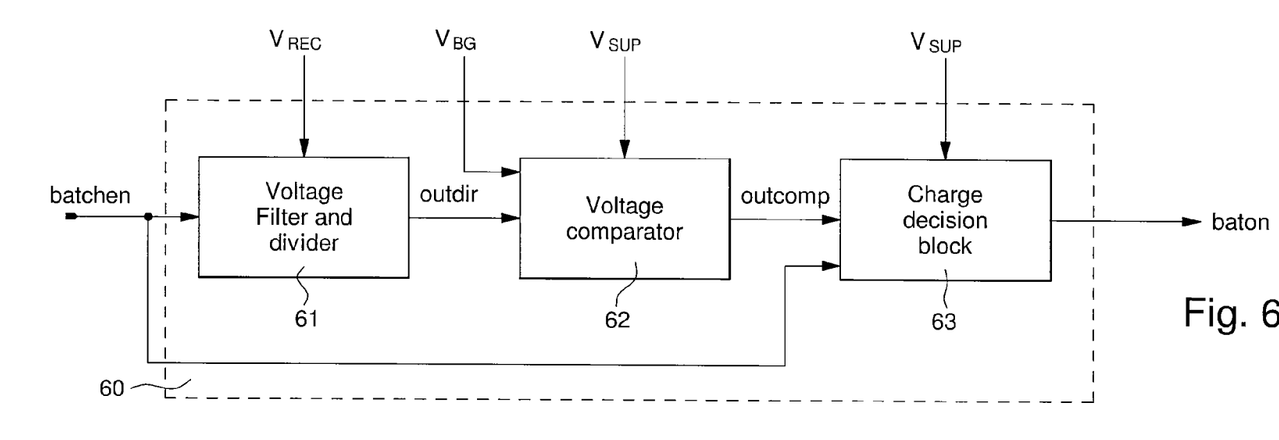
FIG. 6 is a block diagram of the power monitoring circuit.

FIG. 6 is a block diagram of the power monitoring circuit. According to an advantageous variant of the present invention, another original feature of the present invention lies in the use of a block that is responsible for controlling the available energy. This information is important insofar as the integrated circuit uses electromagnetic radiofrequency waves picked up by an antenna, whose level of received energy is variable.

Indeed, it has been observed that, in order to operate, the charger block uses a rectified and filtered voltage source, used by other functions of the integrated circuit. This voltage source also uses the energy from the antenna. There is thus competition between the battery, which takes its energy for its charge, and the charger that needs energy to operate properly. This is the objective of the monitoring circuit to settle the conflict by monitoring the rectified supply voltage $V_{REC}$.

It will also be noted in this regard, that supply voltage $V_{REC}$ is a filtered supply voltage that is derived from the rectified antenna voltage. The level of received energy affects this voltage, which is why it has a severe criticality that has to be monitored. Voltage $V_{SUP}$ is a regulated supply voltage for activating the logic circuits. This voltage is less sensitive to the received energy and does not have any particular criticality. The "batchen" signal is the order to charge the battery originating from the integrated circuit logic, this order can be received at any time even if the available energy is insufficient. The "baton" signal delivered at output is the order actually transmitted to the battery charger. It corresponds to the "batchen" signal completed by the authorisation given by monitoring circuit 60, which will be described in detail below.

Thus, monitoring circuit 60 includes a voltage filter and divider 61 for returning voltage $V_{REC}$ to a level compatible with the bandgap reference voltage in order to make a comparison. Monitoring circuit 60 further includes a comparator 62 which can tell whether the level of power $V_{REC}$ is above or below a fixed minimum threshold. Advantageously, a hysteresis effect is included to avoid hesitations in the switching voltage. Finally, monitoring circuit 60 also includes a battery charge authorisation decision block, which reshapes the signals by combining the battery charge order "batchend" originating from the circuit logic and the authorisation "outcomp," indicated by comparator 62. This charge authorisation decision block 62 supplies the "baton" signal at output for authorising or prohibiting the battery charger to charge.

In summary, the monitoring circuit is responsible for controlling the rectified supply voltage $V_{REC}$. When this supply voltage decreases, but prior to reaching a limit minimum voltage capable of preventing the integrated circuit from operating properly, the circuit sends a "baton" signal for deactivating the battery charge, which is a large consumer of received energy. For as long as the available energy is insufficient, i.e. the voltage level across $V_{REC}$ is too low, the order to charge the battery is blocked. Consequently, the available supply voltage $V_{REC}$ increase again, preventing a malfunction of the integrated circuit. When the rectified voltage level increases sufficiently to allow the charger to operate properly, charging is authorised again. It will be noted that the supply voltage is very quickly regenerated, which makes the increase in battery charge time, due to this temporary interruption, entirely acceptable.

In light of the preceding description, it will be noted further that the charger thereby obtained has numerous advantages. First of all, there is a clear distinction between the period of battery charge during which the switch connects the energy source to the battery to be recharged and, the period during which the battery is being charged and thus has to be disconnected from the energy source. Moreover, the current amplitude remains constant during the entire battery charge, as defined by the calibrated current source reshaping the energy received by the antenna. As a result, the battery charge period is greatly shortened. Furthermore, the voltage comparator, which decides the end of charge is not influenced by the consumption drawn from the battery and thus the end of charge voltage setting is much more precise. Finally, by design, this battery charger naturally delivers the "batchend" signal, which indicates the end of charge since it is the same signal that turns off the battery charge switch. Consequently, it is easy to make the end of charge setting, this end of charge signal then being able to act as indicator. Further, different adjustment means easily allow the battery charge voltage to be set for different reference voltage values and for different types of battery. Finally, the monitoring circuit allows the battery charger to monitor itself, to leave enough energy available for the rest of the circuit, if necessary.

It will also be noted by way of example that the embodiment of the battery charger described above is capable of recharging, without over charging, a battery of the "rechargeable lithium coin battery" type, model VL of the Panasonic company, whose charge voltage is comprised between 3.25 volts and 3.55 volts over a temperature ranging from −20° C. to +60° C. and whose capacity is around 2 mA/H. The charger is capable of respecting the voltage set point over a broad temperature range, for example −40° C. to +85° C., or more. This additional constraint ensures that the battery charger satisfies the battery manufacturer's specifications. The final charge level could be adjustable by programming a logic word. It will be noted that it is possible, with this battery charger, to adapt it by metal mask programming to use it with another type of battery, for example an ML type, whose voltage is comprised between 2.8 volts and 3.2 volts and whose charge is close to 5 mA/H. Again by way of example, this embodiment is capable of having two programmable current levels, one of high intensity with a value of 1.5 mA and the other of low intensity with a value of 0.75 mA +/−50%.

It will be noted, finally, that this type of charger is preferably integrated in a monolithic integrated circuit made in CMOS technology, qualified as a low power circuit, consequently the solution developed has to use the received energy as well as possible. In order to do so, as was described above, it is desirable for the final solution not to rely on the automated techniques of loop back controlled systems, so as to minimise the number of resistors to be integrated and to limit the current consumption due to the leakage currents from the junctions when the function is switched off.

It will be understood that various alterations and/or improvements and/or combinations evident to those skilled in the art could be made to the various embodiments of the invention explained above without departing from the scope of the invention defined by the annexed claims.

What is claimed is:

1. An integrated radiofrequency circuit integrated in a substrate, wherein the circuit includes:
    (a) an antenna that receives radiofrequency signals;
    (b) a rechargeable battery; and
    (c) a battery charger using said radiofrequency signals received by the antenna to charge said battery; wherein said battery charger is integrated in the same substrate as said integrated radiofrequency circuit, and wherein said battery charger includes
        i. calibrating means;
        ii. a current source calibrated by said calibrating means and delivering a charge current of constant maximum intensity drawn from the received radiofrequency signals; and
        iii. a first comparator between a reference quantity representative of an end of battery charge level and a variable quantity representative of the battery charge level supplying at output a control signal ordering the battery to be charged or not charged, wherein said first comparator is a voltage comparator between a reference voltage and a battery voltage, wherein said first comparator includes linearization means for converting the reference voltage into said reference quantity representative of the end of battery charge level and for converting the battery voltage into said variable quantity representative of the battery charge level.

2. The integrated radiofrequency circuit according to claim 1, wherein said reference quantity representative of the end of battery charge level can be adjusted as a function of the type of battery used.

3. The integrated radiofrequency circuit according to claim 2, wherein the end of battery charge adjustment can be programmed by means of a logic word.

4. The integrated radiofrequency circuit according to claim 2, wherein the end of charge level can be adjusted by metal mask programming.

5. The integrated radiofrequency circuit according to claim 1, wherein said reference quantity is a reference voltage, and said calibrating means include linearization means for converting said reference voltage into a reference charge current independent of the level of battery charge.

6. The integrated radiofrequency circuit according to claim 5, wherein said reference charge current is a pulsed charge current whose maximum pulse amplitude is constant.

7. The integrated radiofrequency circuit according to claim 5, wherein said calibrating means further includes a programmable resistor so that two current levels are be provided at output independent of the level of battery charge.

8. The integrated radiofrequency circuit according to claim 1, wherein integrated radiofrequency circuit further includes:
(d) a logic block for controlling said battery charger, and wherein said logic block is powered by said radiofrequency signals to ensure that charging starts quickly.

9. The integrated radiofrequency circuit according to claim 8, wherein the integrated radiofrequency circuit further includes:
(e) a circuit for monitoring the energy available from the received radiofrequency signals, wherein the circuit for monitoring includes a second comparator between the available energy less the energy necessary for said logic block with the energy necessary for charging the battery, wherein the second comparator delivers at output a control signal for authorising or prohibiting battery charging depending upon whether energy is sufficient or insufficient.

10. The integrated radiofrequency circuit according to claim 1, further comprising:
(d) means for ensuring a precise end of charge voltage.

11. The integrated radiofrequency circuit according to claim 1, further comprising:
(d) clear distinction means for distinguishing between charging and not charging the battery.

12. The integrated radiofrequency circuit according to claim 1, further comprising:
(d) a switch provided for activating or deactivating the battery charger.

13. The integrated radiofrequency circuit according to claim 1, further comprising:
(d) an end of battery charge indicator.

14. An active transponder comprising the integrated radiofrequency circuit according to claim 1 for communicating with an external reader.

15. The integrated radiofrequency circuit according to claim 1, wherein the control signal ordering the battery to be charged or not charged is a batchend signal.

16. An integrated radiofrequency circuit integrated in a substrate, wherein the circuit includes:
(a) an antenna that receives radiofrequency signals;
(b) a rechargeable battery; and
(c) a battery charger using said radiofrequency signals received by the antenna to charge said battery; wherein said battery charger is integrated in the same substrate as said integrated radiofrequency circuit, and wherein said battery charger includes
   i. calibrating means;
   ii. a current source calibrated by said calibrating means and delivering a charge current of constant maximum intensity drawn from the received radiofrequency signals; and
   iii. a comparator between a reference quantity representative of an end of battery charge level and a variable quantity representative of the battery charge level supplying at output a control signal ordering the battery to be charged or not charged, wherein said reference quantity is a reference voltage, and said calibrating means include linearization means for converting said reference voltage into a reference current independent of the level of battery charge.

17. The integrated radiofrequency circuit according to claim 16, wherein the control signal ordering the battery to be charged or not charged is a batchend signal.

18. An integrated radiofrequency circuit integrated in a substrate, wherein the circuit includes:
(a) an antenna that receives radiofrequency signals;
(b) a rechargeable battery;
(c) a battery charger using said radiofrequency signals received by the antenna to charge said battery; wherein said battery charger is integrated in the same substrate as said integrated radiofrequency circuit, and wherein said battery charger includes
   i. calibrating means;
   ii. a current source calibrated by said calibrating means and delivering a charge current of constant maximum intensity drawn from the received radiofrequency signals; and
   iii. a first comparator between a reference quantity representative of an end of battery charge level and a variable quantity representative of the battery charge level supplying at output a control signal ordering the battery to be charged or not charged; and
(d) a circuit for monitoring energy available from the received radiofrequency signals, wherein the circuit for monitoring includes a second comparator between the available energy less the energy necessary for a logic block with the energy necessary for charging the battery, wherein the second comparator delivers at output a control signal for authorising or prohibiting battery charging depending upon whether energy is sufficient or insufficient to charge the battery.

19. The integrated radiofrequency circuit according to claim 18, wherein the control signal ordering the battery to be charged or not charged is a batchend signal.

* * * * *